No. 747,575. PATENTED DEC. 22, 1903.
R. C. BAKER.
DRILLING BIT.
APPLICATION FILED APR. 3, 1903.
NO MODEL.
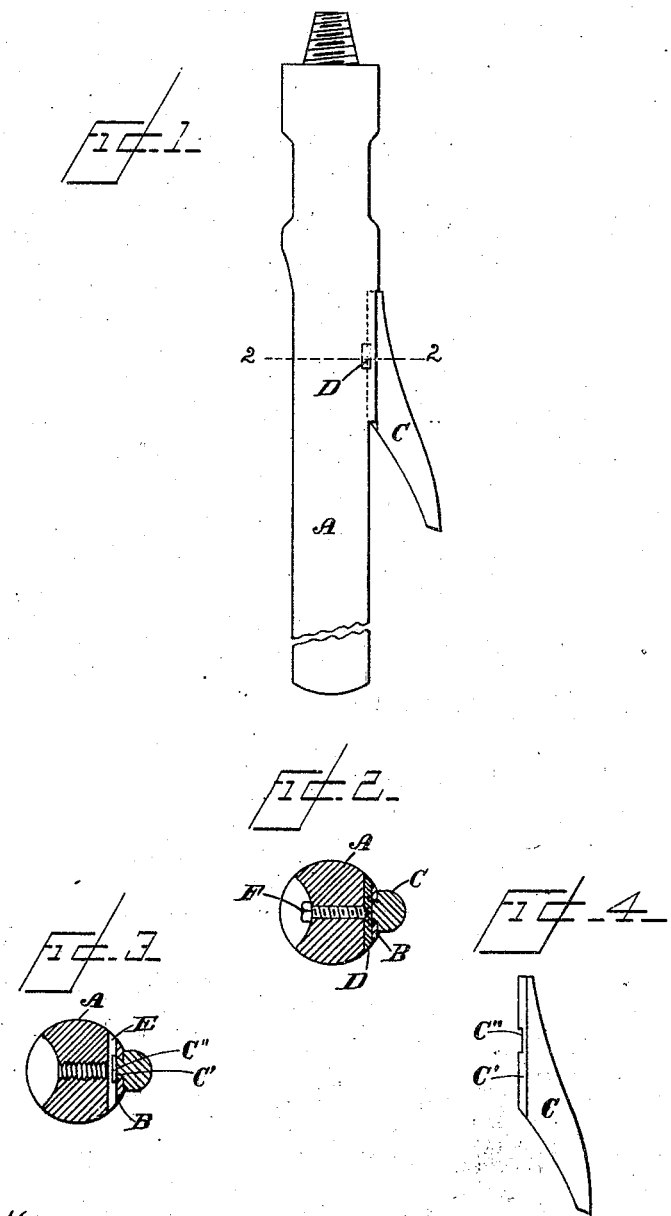

No. 747,575. Patented December 22, 1903.

UNITED STATES PATENT OFFICE.

REUBEN C. BAKER, OF COALINGA, CALIFORNIA.

DRILLING-BIT.

SPECIFICATION forming part of Letters Patent No. 747,575, dated December 22, 1903.

Application filed April 3, 1903. Serial No. 150,987. (No model.)

*To all whom it may concern:*

Be it known that I, REUBEN C. BAKER, a citizen of the United States, residing at Coalinga, in the county of Fresno and State of California, have invented new and useful Improvements in Drilling-Bits, of which the following is a specification.

My invention relates to that class of drills which are used in boring drilled wells by raising and dropping the drill in the hole being drilled; and the object thereof is to provide a drill which will drill a hole large enough for a casing to be put into the hole and which can be drawn up through the casing, so that the same can be sharpened when desired. I accomplish this object by the drill described herein and illustrated in the accompanying drawings, in which—

Figure 1 is a side elevation of my drill, and Fig. 2 is a cross-section on the line 2 2 of Fig. 1. Fig. 3 is a like cross-section with the key and screw omitted. Fig. 4 is a side elevation of the enlarging-bit detached from the main bit.

In the drawings, A is the drilling-bit, by means of which the central portion of the hole is drilled. In one side of the drilling-bit is a dovetail groove B for the reception of the dovetail shank C' of the enlarging-bit C, which is held in place in the groove by key D, which passes through hole E in the drill, the shank having a groove C'' cut therein for the passage therethrough of the key. After the enlarging-bit and the key are in place, a screw F holds the key from slipping, as the point of the screw enters a hole in the key, as shown in Fig. 2. The enlarging-bit projects far enough from the side of the bit to cut a hole large enough to permit the passage of the casing therethrough, and at the same time there is room enough in the casing for the passage therethrough of the drilling-bit with the enlarging-bit attached thereto, as shown in Fig. 1. It will be observed that the upper end of the shank of the enlarging-bit bears against a solid portion of the drill, as shown in full and dotted lines in Fig. 1, which, together with the dovetails of the two parts, provide a firm connection between the two when drilling. When the enlarging-bit becomes dull, it can easily be removed from the drilling-bit and sharpened, and when worn out a new one can easily be attached thereto. I have found by experience that this form of attaching the enlarging-bit to the drilling-bit is superior to attaching the same by bolts, as the bolts soon crystallize and break.

Having described my invention, what I claim as new, and desire to secure by Letters Patent, is—

The combination of a drilling-bit having a dovetail groove in the side thereof, a hole in said bit extending across said groove; an enlarging-bit having a dovetail shank adapted to pass into the groove in the bit, said shank having a groove extending across it adapted to register with the hole in said bit; a key adapted to pass through the hole in the drilling-bit and through the groove in the shank of the enlarging-bit; a screw in said drilling-bit adapted to bear against said key to keep the same from slipping.

In witness that I claim the foregoing I have hereunto subscribed my name this 27th day of March, 1903.

R. C. BAKER.

Witnesses:
S. H. HAIN,
J. S. MCCLURG, Sr.